F. GEHRKE.
ICE CUTTING MACHINE.
APPLICATION FILED MAR. 25, 1912.

1,102,904.

Patented July 7, 1914.
3 SHEETS—SHEET 2.

Witnesses
Chas. W. Stauffiger
Anna M. Dorr

Inventor
Frank Gehrke,
By
Attorneys

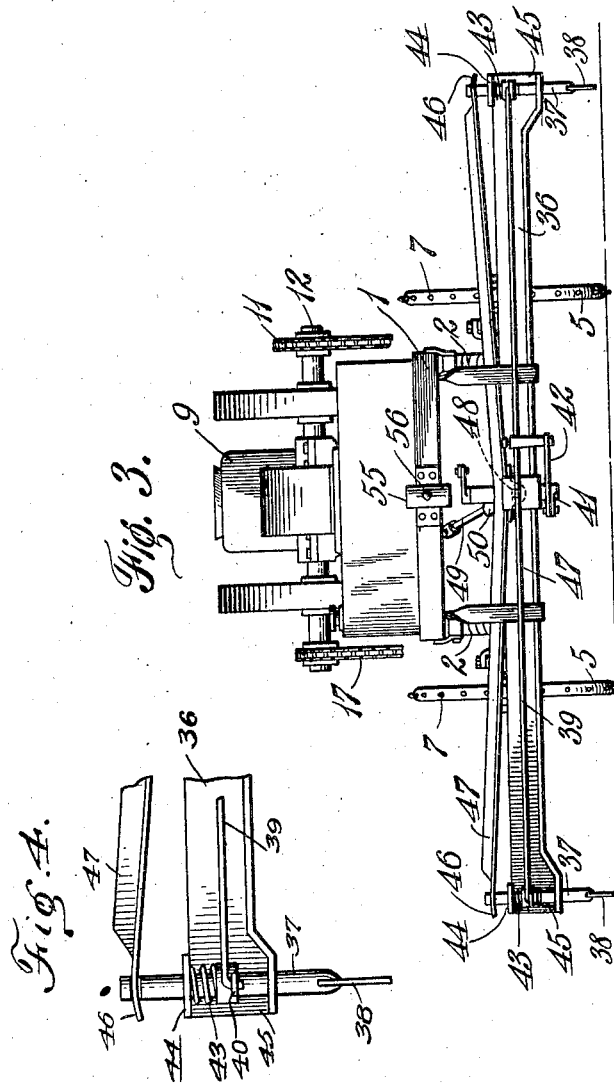

UNITED STATES PATENT OFFICE.

FRANK GEHRKE, OF ROCHESTER, MICHIGAN.

ICE-CUTTING MACHINE.

1,102,904.

Specification of Letters Patent.

Patented July 7, 1914.

Application filed March 25, 1912. Serial No. 685,912.

*To all whom it may concern:*

Be it known that I, FRANK GEHRKE, a citizen of the United States of America, residing at Rochester, in the county of Oakland and State of Michigan, have invented certain new and useful Improvements in Ice-Cutting Machines, of which the following is a specification, reference being had therein to the accompanying drawings.

This invention relates to an ice cutting machine and to an arrangement thereof whereby the same is self propelled and whereby the cutters are power driven, the invention also including means for automatically guiding the machine.

The invention consists in the matters hereinafter set forth, and more particularly pointed out in the appended claims.

Figure 1:
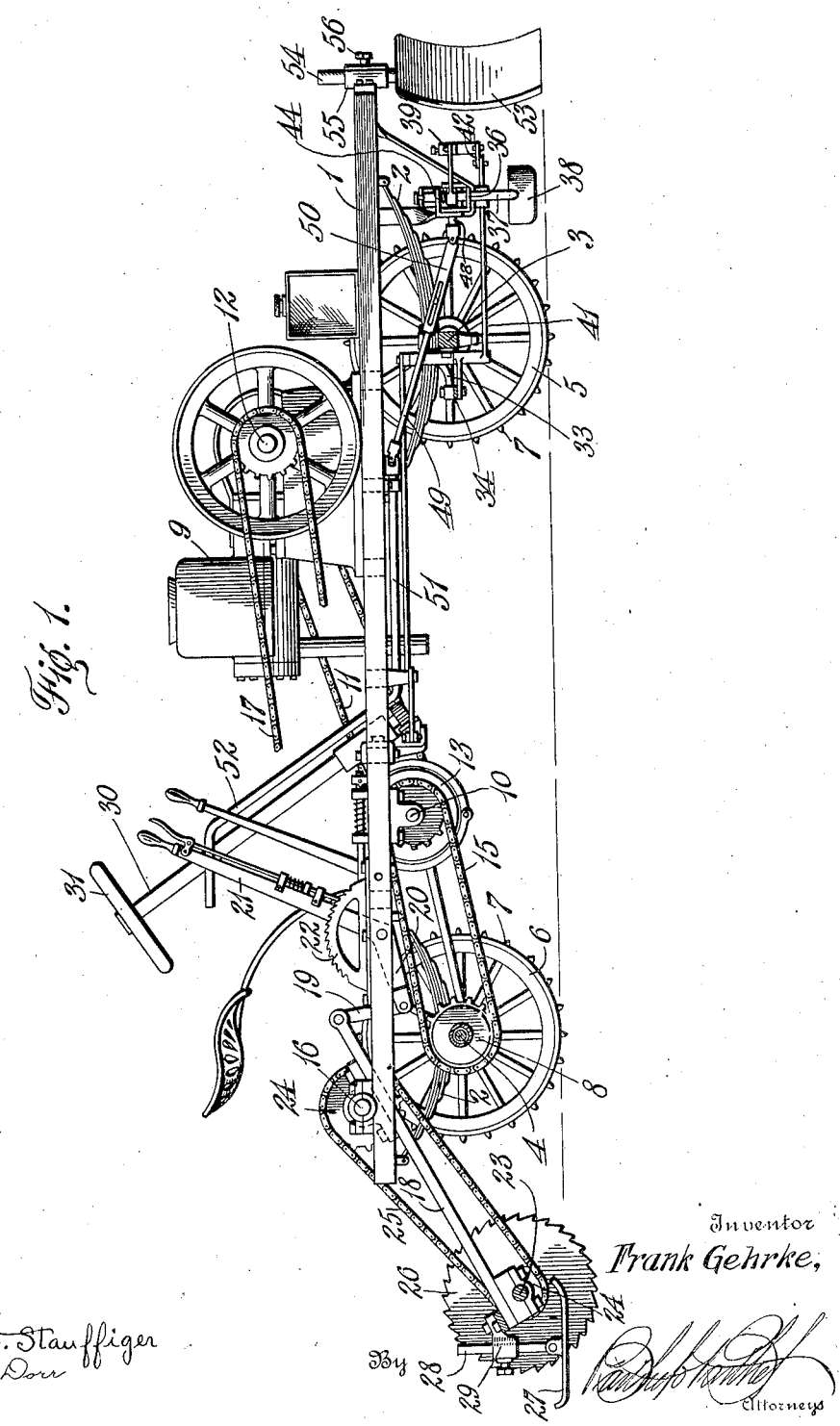
Figure 2:
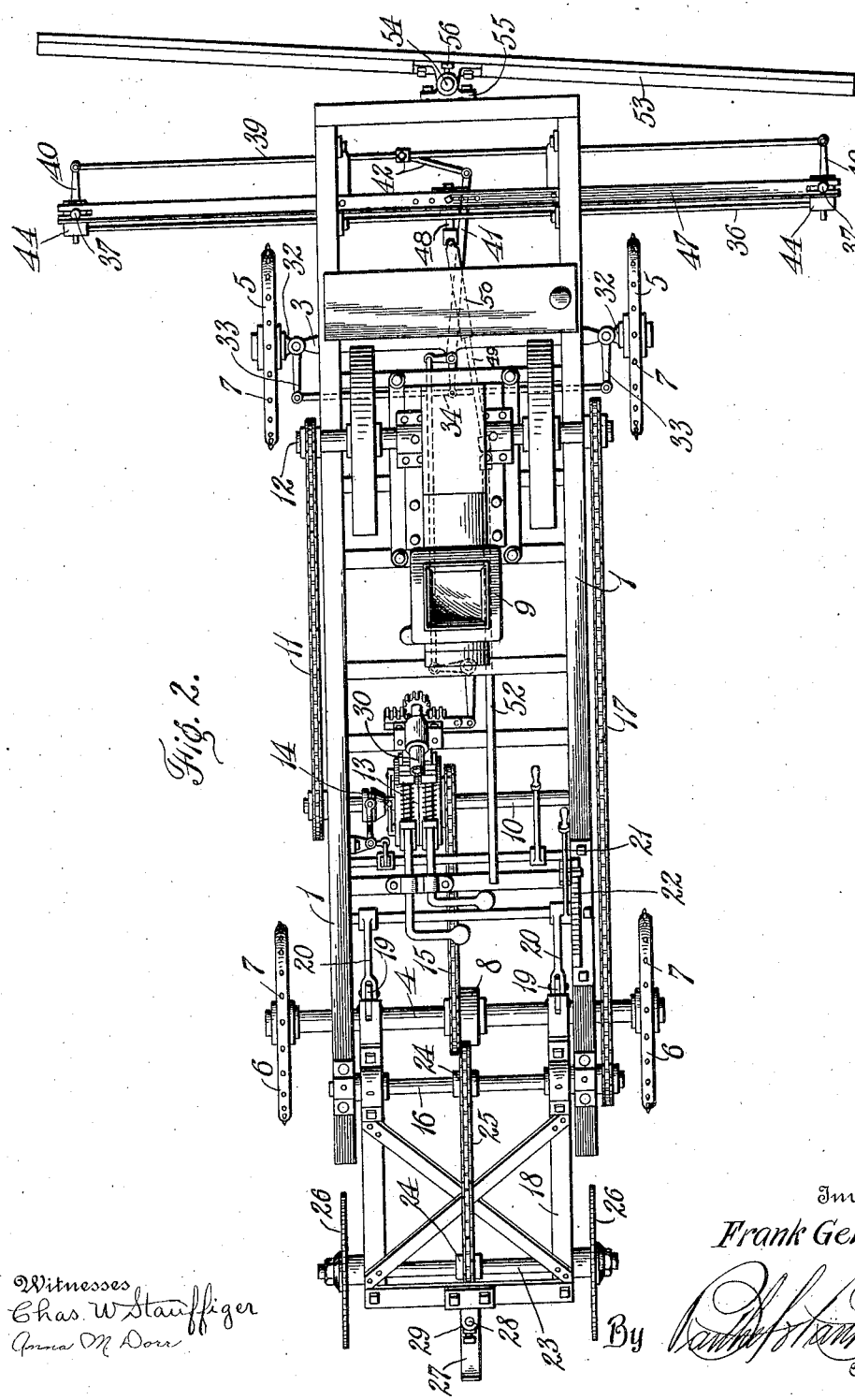

In the drawings, Figure 1 is a view in side elevation of a machine that embodies features of the invention; Fig. 2 is a plan view, partially broken away, of the machine; and Fig. 3 is a view, with parts omitted, of the front or steering end of the machine. Fig. 4 is a view in detail showing the arrangement of springs and guide shoes.

As herein shown in preferred form, a substantially rectangular and properly proportioned frame 1 is mounted, preferably by springs 2, on a forward axle 3 and a rear drive axle 4 with front steering wheels 5 and rear traction wheels 6. Spuds 7 or other suitable devices are provided for causing the peripheries of the wheels to have the proper traction on ice.

A differential drive mechanism indicated at 8 is connected with a motor 9 mounted on the frame through any suitable intervening mechanism. As herein shown, a jack shaft 10 is connected by sprockets and chain indicated at 11 with a main shaft 12 of the motor. Change speed mechanism of any type, indicated at 13, with clutch 14 for locking the latter to the shaft, is coupled by a sprocket chain and suitable wheels indicated at 15 with the driving member of the differential mechanism. It is to be understood that the usual controlling mechanism for this change speed and transmission mechanism is provided although herein shown only in part and conventionally.

A counter shaft 16 is journaled on the rear end of the frame in parallel relation to the shaft 12 from which it is driven by any appropriate means as for example, sprockets and chain 17. The counter shaft 16 or its bearing also forms pivotal support for the inner end portion of a longitudinally tilting and depending saw frame 18 which may be raised and lowered as desired by means of links 19 coupling the forward end of the frame beyond the shaft to the bell crank arms 20 of a hand lever 21 that works in a quadrant 22 on the frame. A saw shaft 23 at the lower or outer end of the auxiliary frame is driven from the counter shaft 16 by any suitable means as for example, sprockets 24 and chain 25. Ice cutting saws 26 are secured to the shaft 23 in proper spaced relation. To further regulate the depth of cut when the frame 18 is not supported by the lever 21, a shoe 27 is adjustably secured by means of a stem 28 clamped in a block 29 by suitable means to the rear of the frame 18 so that the shoe slides on the ice and limits the depth of the saw cut.

A steering post 30 within the convenient reach of the operator supports a hand wheel 31 that is operatively connected to steering knuckles 32 on the forward axle 3 by any of the well known means for guiding self propelled vehicles, the steering arms 33 of the knuckles being coupled in the usual manner by a cross link 34 to swing together.

To assist in holding the machine in proper relation to a saw kerf on either side of the machine or a marking groove, a transverse member 36 of the frame supports at its outer end upright spindles 37 which are vertically movable in the transverse member and carry at their lower ends guide shoes 38 adapted to enter a saw kerf or marker cut. The spindles 37 are rotatable in their supports and are connected to turn together by a link 39 pivoted to laterally projecting arms 40 on the spindles. Any swinging of these spindles is communicated to the link 34 by means of a suitable lever 41 and rod 42 so that as the shoes turn in the cuts they swing the guide wheels to follow them. The spindles are normally held with their shoes clear of the ice by suitably disposed springs 43 which are in compression between the guide lugs 44 of the member 36 in which the spindles 37 are reciprocable, and the arms 40 on the spindles 37. The upper ends of said spindles are attached to the ends of a rock bar 47. As the springs 43 normally depress the ends of the rock bar 47 equally and in opposite direction since they are both in compression between the guide lugs 44 on the member 36 and the arms 40 on the spindles 37, the rock bar is not free to tilt on its axis but is yieldingly held in substantially horizontal position or in parallel relation to the member 36. This prevents either end from being depressed enough to cause the guide shoes 38 to enter a saw kerf in the ice. The bar 47 may be tilted in either direction by means of a shaft 48 horizontally journaled in the member 36 longitudinally of the frame 1, that is connected by means of a tumbling rod 49, having a telescoping or slip joint 50 to allow for the motion of the frame on the springs, and a rock shaft 51 whose upturned end portion 52 is in suitable operative relation to the driver's station, so that the latter by throwing the handle or end portion of the part 52 to one side or the other, may correspondingly depress one of the guide shoes 38 to engage a saw kerf or cut. As a further detail, of construction a suitably designed scraper 53 may be supported on the forward end of the machine in such manner as to be angularly adjustable preferably by means of an upright stem 54 passing through a bearing boss 55 with a clamping screw 56 to hold it in adjusted position.

In operation the driver may either guide the machine by hand for the initial cut or make use of the automatically operating guide shoes to hold the machine in operative relation to a saw cut or marker groove already made. By proper manipulation of the saw frame lever, the saws may be swung clear of the ground for road travel or may be lowered to operate on the ice. The machine may be readily controlled, so far as driving is concerned, through a manually operable steering device which may be made automatic by shifting the guide shoes into position.

The machine is simple and effective in operation and the weight is so distributed as not to be excessive on any one wheel.

Obviously, changes in the details of construction may be made without departing from the spirit of my invention and I do not care to limit myself to any particular form or arrangement of parts.

What I claim is:—

1. In an ice cutting machine, a main frame supported on steering and traction wheels, a motor on the frame operatively connected to the traction wheels, controlling mechanism for governing the motor, rotatable ice cutters adjustably mounted on the frame and operatively connected to the motor, means for automatically guiding the machine, springs for holding the guiding means normally inoperative, and manually operable means for throwing the guiding means into engagement with a kerf in the ice.

2. In an ice cutting machine, a main frame mounted on steering and traction wheels a motor on the frame operatively connected to the traction wheels, an auxiliary frame adjustably secured on the main frame, ice cutters mounted on the auxiliary frame, mechanism operatively connecting the motor and cutters, manually operable steering means, automatic means for controlling the steering means independently of the manual control, spring members for normally holding the automatic steering control members in inoperative position and manually operable means for throwing the automatic guiding means into engagement with a kerf in the ice.

3. In an ice cutting machine, a main frame mounted on steering and traction wheels, a motor on the frame operatively connected to the traction wheels, a saw frame angularly adjustable on the main frame, a gage for regulating the position of the auxiliary frame, rotatable ice cutters mounted on the auxiliary frame and operatively connected to the motor, means for automatically controlling the steering wheels to guide the machine and manually operable means for throwing the automatic controlling means into engagement with a kerf in the ice.

4. In an ice cutting machine, a main frame, steering and traction wheels supporting the main frame, a motor on the frame operatively connected to the traction wheels, a saw frame pivoted on the main frame, a gage adjustably secured to the saw frame for supporting the free end of the latter, rotatable cutters mounted on the saw frame and operated by the motor, manually operable means controlling the steering wheels, means for automatically controlling the steering mechanism when moved into engagement with a groove in ice traversed by the machine, spring means for normally holding the automatic controlling means clear of the ice and means for throwing such controlling means into such engagement.

5. In an ice cutting machine, a main frame mounted on steering and traction wheels, a motor for driving the traction wheels, a saw frame pivoted on the main frame to trail on ice traversed by the machine, ice cutters on the free end portion of the saw frame, means operatively connecting the motor to the cutters to rotate the latter, means for raising the saw frame and cutters into inoperative position, manually operable means for steering the machine adapted to operate automatically when thrown into engagement with grooves in ice traversed by the machine, means for throwing such steering gear into such engagement and spring members normally holding the guiding means in disengaged relation to the surface traversed by the machine.

6. In an ice cutting machine, a main frame, traction and steering wheels on which the frame is yieldingly mounted, a saw frame swinging from the main frame, an adjustable gage for supporting the free end of the saw frame, ice cutters rotatably mounted on the saw frame, a motor on the main frame, means operatively connecting the cutters and motor to drive the former, means operatively connecting the traction wheels and motor to propel the machine, means for controlling the steering wheels adapted to operate automatically when in engagement with a groove in ice traversed by the machine, and means for throwing the steering means into such engagement with such groove.

7. In an ice cutting machine having traction wheels, a motor for driving the traction wheels, ice cutters operated by the motor, and steering wheels, a transverse member on the main frame, a rock arm pivoted on the transverse member to tilt in either direction transversely of the machine, guide shoes supported on the outer portion of the rock arm, springs yieldingly retaining the rock arm and shoes in inoperative position, manually operable means for tilting the rock arm to throw either guide shoe into a groove in ice traversed by the machine, and means operatively connecting the guide shoes with the steering wheels to swing the latter when the guide shoes swing.

In testimony whereof I affix my signature in presence of two witnesses.

FRANK GEHRKE.

Witnesses:
C. R. STICKNEY,
ANNA M. DORR.

Copies of this patent may be obtained for five cents each, by addressing the "Commissioner of Patents, Washington, D. C."